(12) United States Patent
Custer et al.

(10) Patent No.: US 9,825,820 B2
(45) Date of Patent: *Nov. 21, 2017

(54) COMMUNICATION EFFECTS IN NETWORK SIMULATIONS

(71) Applicant: The Boeing Company, Chicago, IL (US)

(72) Inventors: Robert C. Custer, Corona, CA (US); Robert J. Harrison, Saint Charles, MO (US); Brian J. Waltersdorf, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 270 days.

This patent is subject to a terminal disclaimer.

(21) Appl. No.: 14/557,352

(22) Filed: Dec. 1, 2014

(65) Prior Publication Data

US 2015/0085691 A1 Mar. 26, 2015

Related U.S. Application Data

(63) Continuation-in-part of application No. 12/969,574, filed on Dec. 15, 2010, now Pat. No. 8,902,767.

(51) Int. Cl.
| | |
|---|---|
| *H04L 12/28* | (2006.01) |
| *H04L 12/24* | (2006.01) |
| *H04L 12/26* | (2006.01) |
| *H04W 16/22* | (2009.01) |
| *H04J 1/16* | (2006.01) |

(52) U.S. Cl.
CPC ........ *H04L 41/145* (2013.01); *H04L 41/5038* (2013.01); *H04L 43/08* (2013.01); *H04L 43/10* (2013.01); *H04L 43/50* (2013.01); *H04W 16/22* (2013.01)

(58) Field of Classification Search
USPC ............................. 370/252, 241, 329, 386
See application file for complete search history.

(56) References Cited

U.S. PATENT DOCUMENTS

| | | | |
|---|---|---|---|
| 5,794,128 A | 8/1998 | Brockel et al. | |
| 8,352,223 B1 | 1/2013 | Anthony et al. | |
| 9,015,019 B1* | 4/2015 | Kim ..................... | H04W 16/22 703/13 |
| 2001/0049594 A1* | 12/2001 | Klevans .................. | H04L 41/12 703/14 |

(Continued)

OTHER PUBLICATIONS

Search Report for related European Application No. EP 15196890; report dated Apr. 16, 2016.

*Primary Examiner* — John Pezzlo
(74) *Attorney, Agent, or Firm* — Miller, Matthias & Hull LLP (57) ABSTRACT

A method for a system that runs a platform simulation and a network simulation of a radio network comprises probing the network simulation to determine effects produced between transmitter-receiver pairs represented within the network simulation; computing communication effects in response to the probing and saving the communication effects for later use; and when a communication event involving a transmitter-receiver pair occurs in the platform simulation, using the saved communication effects to simulate the communication effects for that event.

19 Claims, 6 Drawing Sheets

(56) References Cited

U.S. PATENT DOCUMENTS

2005/0048964 A1* 3/2005 Cohen ................ H04W 16/18
　　　　　　　　　　　　　　　　　455/423
2009/0252134 A1* 10/2009 Schlicht ............... H04L 1/0015
　　　　　　　　　　　　　　　　　370/338
2012/0155522 A1　6/2012 Custer et al.

* cited by examiner

COMMUNICATION EFFECTS IN NETWORK SIMULATIONS

This is a continuation-in-part of copending U.S. Ser. No. 12/969,574 filed on 15 Dec. 2010 and issued as U.S. Pat. No. 8,902,767.

BACKGROUND

Network simulation is used to design various kinds of networks, simulate and then analyze the effect of various parameters on network performance. Network simulation tools can test scenarios that might be particularly difficult or expensive to emulate using real hardware.

In a simulation of a radio network, where a message is transmitted wirelessly from one node to another, a perfect communication may be modeled. In a perfect communication, every message is received without error or delay. Although a perfect communications model significantly simplifies the simulation, it does not reflect the actual conditions that wireless communications encounter in the real world. Thus, it can introduce significant inaccuracies in simulation results.

For a more accurate simulation, communication effects may be incorporated. Communication effects refer to communications within a simulation environment in a manner that is consistent with effects experienced in the real world. For instance, messages might be dropped, corrupted, delayed, jammed, or blocked by terrain, or they may be affected by weather, network congestion, etc.

To incorporate realistic communication effects, calculations are performed on each simulated radio transmission to evaluate the effects of certain characteristics (e.g., location of receiver, blockage of line of sight, effects of network protocols) on each transmitter and receiver. Each message is either delivered with realistically calculated errors, noise, and delays to each separate receiver or it is not delivered at all (that is, dropped).

The communication effects are simulated by performing calculations inline at the time they occur in the simulation. For each separate radio transmission that occurs in a simulation, a network simulator tool is invoked to perform all communication effects calculations at that time for that message, and then the tool determines whether the message was dropped or delivered.

There are problems with simulating communication effects in large networks. In simulations of low latency networks, delivery decisions can take too long to compute. The time taken to simulate a transmission might take considerably longer than the time required to deliver the decision. If target/contact calculations are based on a (realistic) low latency (as is the case with cockpit simulators), the entire simulation can be rendered invalid or unworkable.

Drop decisions can cause additional problems. If a network simulator cannot distinguish between a message that is slow and a message that will never arrive, it will wait until the message arrives or a timeout occurs (whichever occurs first). By waiting, the receivers tie up buffers.

Network scalability is also a problem. Each communication effect can require a large amount of computations. Moreover, the number of computations per transmission increases as higher fidelity communication effects is needed. Thus, high fidelity simulations might be achievable for a hundred nodes, but not for thousands of nodes. Or, if the number of computations per transmission is held the same as the number of simulated nodes increases, the communication effects fidelity is reduced.

SUMMARY

According to an embodiment herein, a method for a system that runs a platform simulation and a network simulation of a radio network comprises probing the network simulation to determine effects produced between transmitter-receiver pairs represented within the network simulation; computing communication effects in response to the probing and saving the communication effects for later use; and when a communication event involving a transmitter-receiver pair occurs in the platform simulation, using the saved communication effects to simulate the communication effects for that event.

According to another embodiment herein, a system comprises a network simulation engine for running a network simulation including a plurality of transmitter-receiver pairs; and a communication effects engine for simulating real-time, high fidelity communication effects of transmissions between the transmitter-receiver pairs in the network simulation. The communication effects engine probes the network simulation, computes communication effects in response to the probing and saves the communication effects. The communication effects engine uses the saved communication effects for later events involving the transmitter-receiver pairs.

According to another embodiment herein, an article comprises non-transitory memory encoded with data for functioning as an interface between a platform simulation engine running a platform simulation and a network simulation engine running a network simulation. The data, when executed, causes a processor to simulate real-time, high fidelity communication effects for transmitter-receiver pairs represented within the network simulation including generating requesting the network simulator to generate Probe messages for all transmitter-receiver pairs of interest, computing communication effects data in response to the Probe messages and saving the communication effects data, and using the saved communication effects for later events involving the transmitter-receiver pairs in the platform simulation.

These features and functions may be achieved independently in various embodiments or may be combined in other embodiments. Further details of the embodiments can be seen with reference to the following description and drawings.

DETAILED DESCRIPTION

A radio network may include a plurality of platforms that function as a radio receiver, or radio transmitter, or both. The platforms communicate directly or indirectly via communications links. Radio communications are traditionally performed via radio frequency (RF) waves. However, radio communications may also be performed via laser, sonic pulses, or wires or any combinations thereof.

The communications links may have statistical connectivity, delay, and error characteristics. These error characteristics may be affected by a number of factors, including, but not limited to radio transmission frequency, bandwidth, power, modulation, location of each potential transmitter and receiver, blockage of a line-of-sight radio signal by terrain or structures, antenna type, characteristics, gain patterns, orientation, signal fading or loss due to weather or other atmospheric effects, multipath reflections, jamming, individual node and overall network traffic loads, and effects of network protocols (which can dynamically drop or delay messages to accommodate higher priority traffic or to ease network congestion). These characteristics can vary over time.

The platforms may be stationary or mobile. A number of mobile platforms could form a wireless ad hoc network, in which the communications links are dynamic.

A radio network is not limited to any particular number of platforms. The platforms may form a single network, subnets within a network, or multiple networks.

Figure 2:
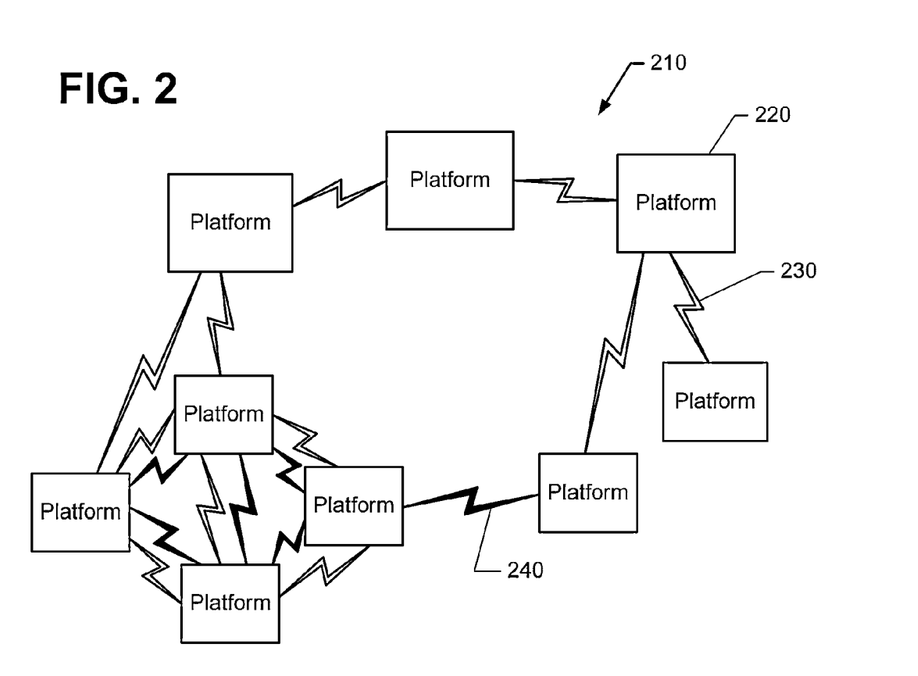
FIG. 2 is an illustration of a radio network.

FIG. 2 illustrates an example of a radio network 210. The radio network of FIG. 2 includes nine platforms 220 that form first and second networks. The first network is formed by communications links 230 (represented with solid fill), and the second network is formed by communications links 240 (represented by no fill).

Figure 1:
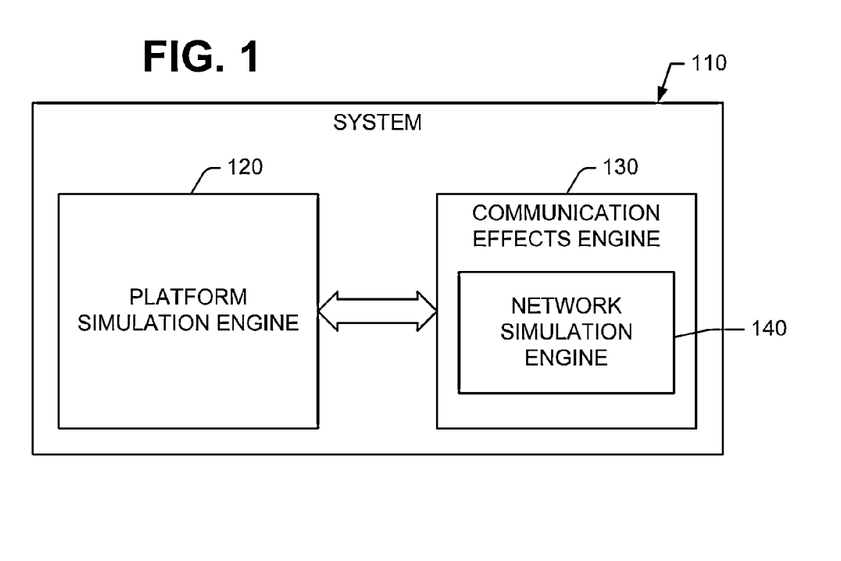
FIG. 1 is an illustration of a system including a platform simulation engine, a communication effects engine, and a network simulation engine.

Reference is made to FIG. 1, which illustrates a system 110 including a platform simulation engine 120, a communication effects engine (CEE) 130, and a network simulation engine 140. The platform simulation engine 120 runs a platform simulation, which involves multiple platforms that communicate via a radio network. The platform simulation engine 120 may simulate force effects such as platform movement, operation and interaction.

The network simulation engine 140 runs a simulation of the radio network. When a transmitter-receiver communication occurs in the simulation of the radio network, a transmitting platform (transmitter) transmits a message to a receiving platform (receiver). The message can affect actions in the simulation of the radio network. For example, a message might cause a platform to change its position or mode of operation. Thus, the platform simulation engine 120 needs to know how long a message takes to arrive, if that message arrives at all. However, the platform simulation engine 120 does not account for the terrain, atmospheric conditions, network topology, routing protocols, network loading, etc.

The CEE 130 provides an interface between the platform simulation engine 120 and the network simulation engine 140. The CEE 130 simulates the communication effects with a high level of fidelity. In addition to accounting for transmitter and receiver characteristics, the CEE 130 account for other characteristics (including those listed above) that can affect message delivery.

The CEE 130 also "probes" the network simulation to determine the effects the network simulation engine 140 produces between transmitter-receiver pairs represented within the network simulation. Probing involves sending "Probe" messages within the network simulation. A Probe message is sent from a transmitter in the network simulation to a receiver in the network simulation. The CEE 130 evaluates results of the Probe message, including whether the Probe message arrived, its latency, and route traveled. The results of the Probe message are stored in the CEE 130 for later use. The CEE 130 may cause the network simulation engine 140 to send the Probe messages. The platform simulation engine 120 need not be aware that the Probe messages are being sent.

A Probe message is a small message having little to no payload. Data fields are irrelevant, except perhaps to add size to the message to simulate the timing correctly. As but one example, a Probe message may consist of a simple header and several bytes of dummy data. The Probe message may also include metadata to aid in determining the success of a probe as an implementation detail for a specific network simulation engine 140.

In the system 110 of FIG. 1, the CEE 130 is wrapped around the network simulation engine 140. Wrapping the CEE 130 around the network simulation engine 140 enables the system 110 to work with a variety of network simulators, each with their own proprietary APIs and internal methods. In addition, it enables the platform engine 120 to run with a variety of platform simulators, each with their own proprietary APIs and internal methods. The platform simulation engine 120 may even run a Virtual Interactive Simulation Environment (VISE).

Figure 3:
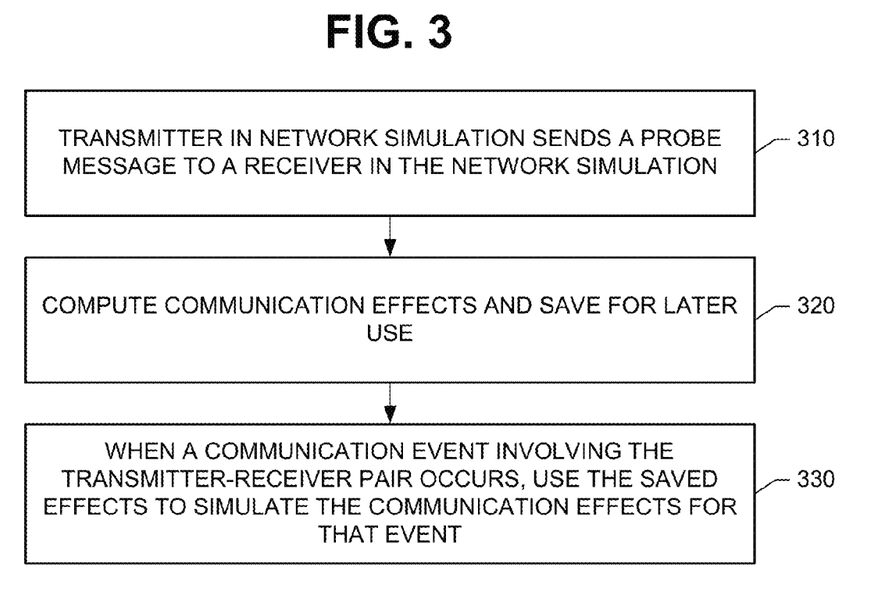
FIG. 3 is an illustration of a method of simulating real-time, high fidelity communication effects within the system of FIG. 1.

Reference is made to FIG. 3, which illustrates a method of simulating real-time, high fidelity communication effects within the system 110 of FIG. 1. At block 310, a Probe message is sent from a transmitter in the network simulation to a receiver in the network simulation.

At block 320, communication effects are computed in response to the Probe message. The communication effects are computed just as they would be for a message sent by a transmitting platform during a network simulation (i.e., computed by the network simulation engine 140). Simulated routing protocols provide representative route convergence and route selection delays. Simulated message loads are representative of a real radio network, as are simulated end-to-end delays and congestion.

The communication effects are saved for later use. The communication effects may be saved in a lookup table.

At block 330, when a communications event involving the transmitter-receiver pair occurs in the platform simulation, the saved effects are used to simulate the communication effects for that event. As a first example, the saved effects show no connectivity for the receiving platform. When a message is sent between the pair during the platform simulation, the saved effects immediately show a drop decision rather than waiting for a timeout to occur. As a second example, the saved effects show that a message between the pair will be delivered with calculated errors, noise, and delays. When a message is sent from the transmitting platform to the receiving platform during the platform simulation, the saved effects are used to determine errors, noise and delay of the delivered message.

Figure 4:
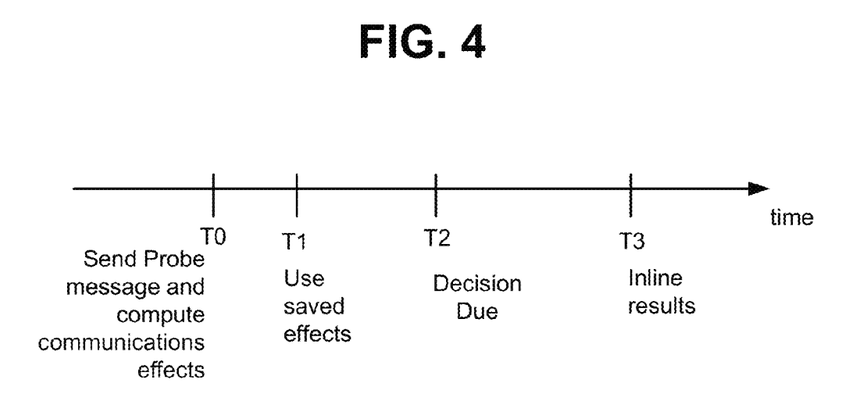
FIG. 4 is an illustration of response times in a low latency network.

Additional reference is made to FIG. 4, which illustrates advantages of this method. Consider a low latency network. A receiving platform receives a transmission at time T1, and it must deliver a decision by time T2. Had the decision been computed, it would have been delivered at time T3, which is too late. However, by sending a Probe message from the transmitter to the receiver in the network simulation, and generating and saving the communication effects at time T0, the saved effects can be used at time T2. Thus, a delivered decision is timely.

Another advantage is that drop decisions can be made immediately. If the communication effects saved at time T0 indicate that the receiving platform is unable to receive a message, the drop decision can be made at time T1 instead of waiting until time T2. This allows simulation resources to be freed up.

Accuracy of the saved effects will depend in part on how close in time a Probe message is to the transmission in the platform simulation (that is, the difference between times T0 and T1). Accuracy also depends on how closely the network simulation traffic matches the platform simulation traffic and how closely the Probe message characteristics match the characteristics of the messages in the platform simulation (e.g. size, protocol type, priority).

Accuracy of the saved effects can be improved by sending additional Probes messages at periodic intervals, whereby the saved effects are updated. The Probe messages may be sent at intervals fast enough that the network state does not change appreciably between them but slow enough that network loading is virtually unaffected.

The method of FIG. 3 has been described for a single transmitter-receiver pair. In practice, a simulation may include many transmitter-receiver pairs. The method of FIG. 3 can be applied to each transmitter-receiver pair in the simulation.

Figure 5:
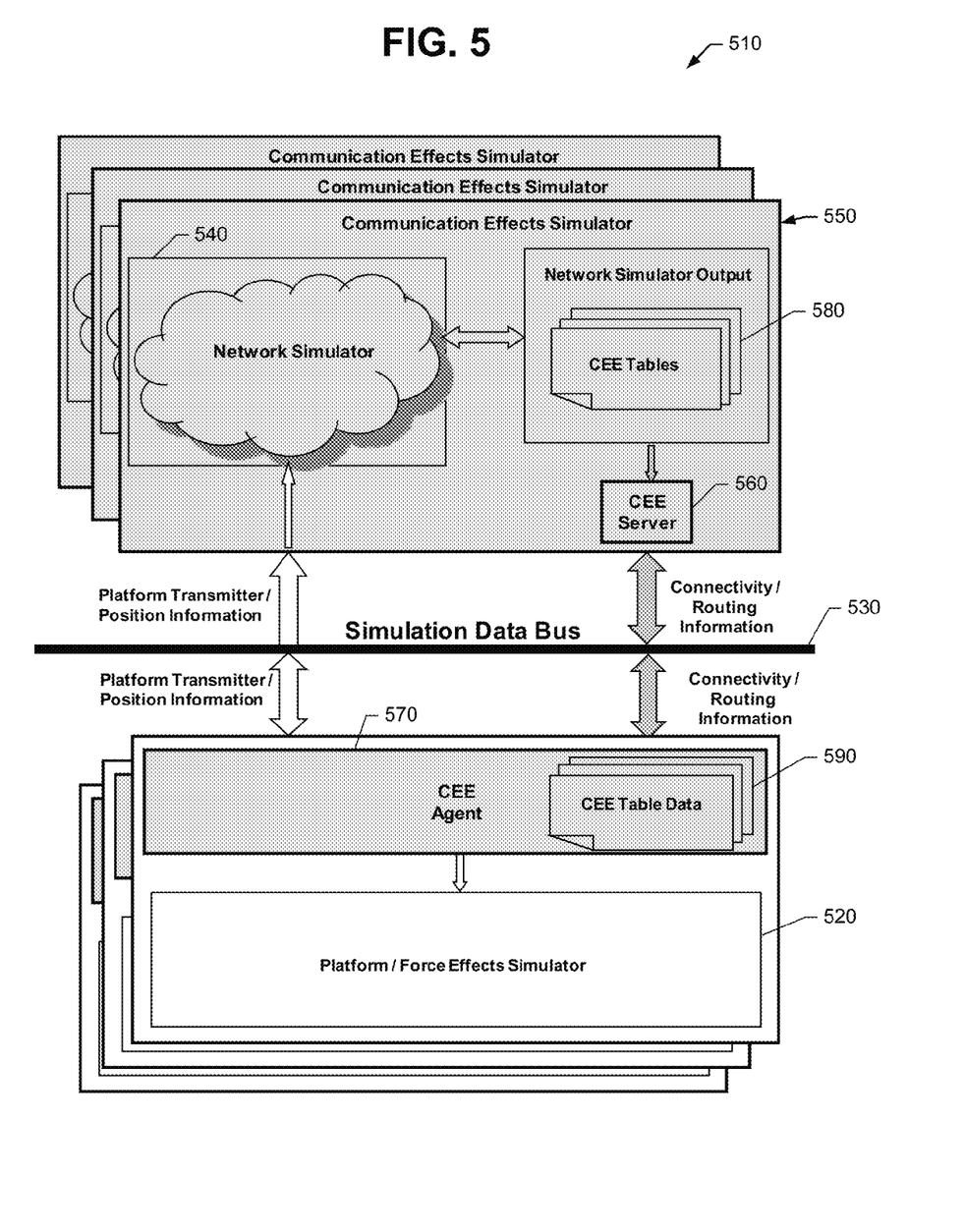
FIG. 5 is an illustration of a system including distributed platform simulators, communication effects simulators, and network simulators.

Reference is now made to FIG. 5, which illustrates a system 510 including a distributed platform simulation engine, a distributed communication effects engine, and a distributed network simulation engine. Components of the communication effects engine and the network simulation engine are shaded, and components of the platform simulation engine are not shaded.

The platform simulation engine includes a plurality of platform simulators 520. The platform simulators 520 provide platform position and transmitter information to the distributed CEE via a simulation data bus 530 using a protocol for data exchange. One such protocol is Distributed Interactive Simulation (DIS), which is a recognized IEEE standard. Another protocol that can be used is Higher-Level Architecture (HLA). The platform simulators 520 may reside on a plurality of clients, which may be implemented in hardware as a plurality of networked computers.

The distributed network simulation engine includes a plurality of network simulators 540, which use the platform position and transmitter information to simulate a radio network with high fidelity. The network simulators 540 may be a proprietary simulation tool or a commercial off-the-shelf simulation tool, such as OPNET, QualNet or CORE. The network simulators 540 simulate the protocols (routing, data transfer, etc.) and traffic loading. They may generate end-to-end connectivity (connected/disconnected) and traffic statistics (min delay, mean delay, etc.) on connections of interest (i.e. relevant to force effects simulation). The network simulators 540 may also generates link connectivity and loading statistics. On request, a network simulator 540 may report the current end-to-end route for a specified source-destination pair. The network simulators 540 may reside on a single computer or a plurality of networked computers.

The distributed CEE includes a plurality of communication effects simulators 550. Each communication effects simulator 550 includes a CEE server 560, which communicates with CEE agents 570 over the simulation data bus 530. The CEE agents 570 provide an interface between the CEE servers 560 and the platform simulators 520. The CEE agents 570 may reside in the same computer(s) as the platform simulators, or the CEE agents 570 may reside in a separate computer or computers that control the message routing to the platform simulation computer(s).

The CEE servers 560 and the CEE agents 570 may communicate via a CEE protocol in which CEE agents 570 register platforms for which communication effects should be computed. The CEE servers 560 may respond with a list of all registered platforms, as well as periodic information on the network state.

The CEE servers 560 and CEE agents 570 may be implemented as application programming interfaces (APIs). An API for a CEE agent 560 may wrap a platform simulator 520 to allow the platform simulator 520 to receive the communication data from the CEE Servers 560. An API for a CEE agent 570 may wrap a network simulator 540. A single CEE agent 570 may represents one to many platforms. A single CEE Server 560 may support one to many CEE agents 570.

Figure 6:
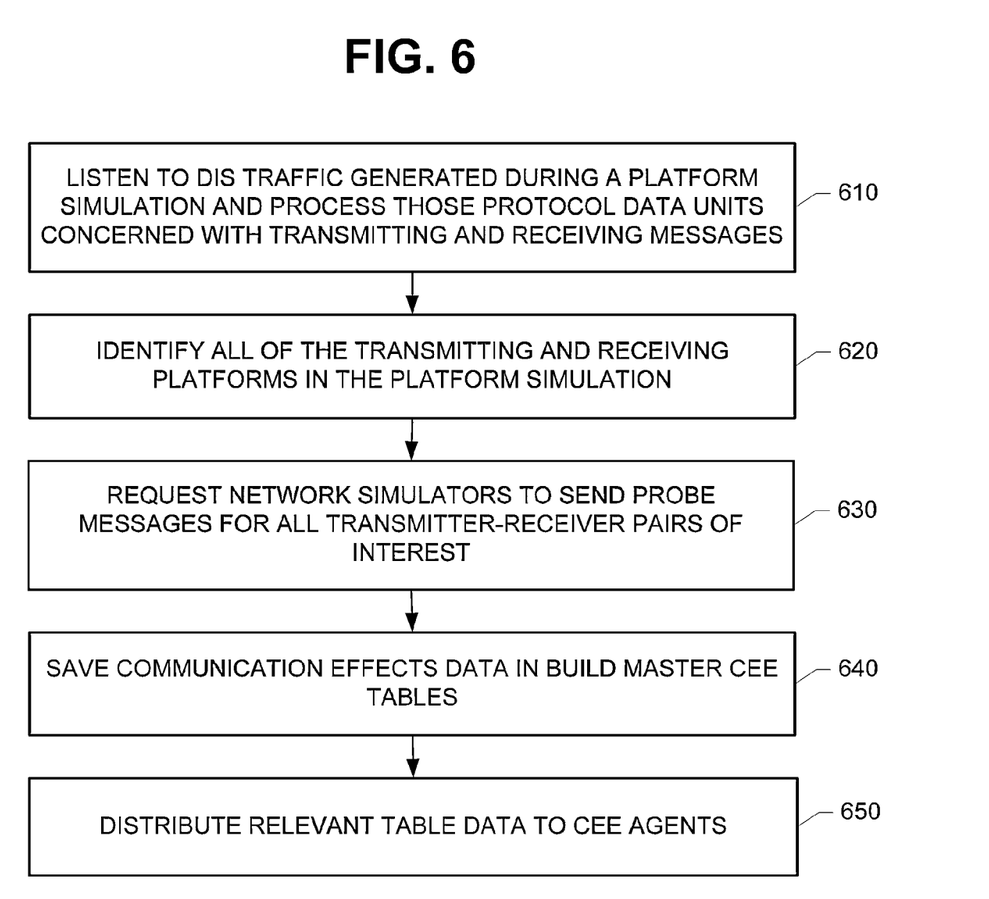
FIG. 6 is an illustration of a method performed by a CEE server of the communication effects engine.

Additional reference is made to FIG. 6, which illustrates an example of functions performed by the CEE server 560. In the example, data exchanged between the network simulators 540 and the CEE server 560 will follow the DIS protocol. A simulation that uses the DIS protocol generates data elements termed Protocol Data Units (PDUs) to specify data about the name, type, attributes, and behaviors of each entity in the platform simulation, including transmitting and receiving platforms. Examples of the PDUs are listed in Table 1 below.

TABLE 1

| | |
|---|---|
| Entity State PDU | Specifies positions of radios and jammers |
| Transmitter PDU | Specifies radio transmission parameters (frequency, etc.) |
| Electromagnetic Emission PDU | Specifies radar/jammer transmission parameters |
| Identification, friend or foe (IFF) PDU | Specifies IFF transmission parameters |
| Start/Resume PDU | Monitors simulation time, and starts or resumes the simulation |
| Stop/Freeze PDU | Monitors simulation time, and stops or pauses the simulation |

At block 610, the CEE server 560 "listens" to the DIS traffic generated during a platform simulation and processes those PDUs that are concerned with transmitting and receiving messages.

At block 620, based on the DIS traffic, the CEE Server 560 identifies all transmitting and receiving platforms of interest in the platform simulation. The CEE server 560 can also narrow the list of transmitter-receive pairs to only those of interest.

At block 630, the CEE Server 560 requests the network simulators 540 to generate Probe messages for all corresponding transmitter-receiver pairs of interest.

The Probes messages may be scheduled at periodic intervals. The Probe messages may be sent frequently enough that the transmission characteristics between platforms can be reasonably assumed to not vary much between the Probe message and messages in the platform simulation, but not so frequently that the Probe messages themselves impose significant additional traffic load across the network or on the network simulation. For example, short Probe messages may be sent 1-2 times per second.

The Probe messages may instead be scheduled once at the start of the platform simulation and run for the duration, or they may be sent aperiodically at any point during the platform simulation.

The network simulators 540 determine the characteristics (e.g., connectivity statistics, delay statistics, and error statics) from the Probe messages for each transmitter-receiver pair to produce communication effects data.

At block 640, the CEE server 560 saves the communication effects data in Master CEE tables 580. The Master CEE tables 580 may be organized by transmitter-receiver pairs, and the content in each table is a specific characteristic of that pair. The tables 580 contain information on broken as well as degraded links.

Table 2 provides a simple example of a three by three connectivity Table. The columns correspond to the transmitting platforms, and the rows correspond to the receiving platforms. A table entry of "1" indicates "connectivity" between the transmitting platform and the receiving platform. A table entry of "0" indicates "no connectivity" between the transmitting platform and the receiving platform. The diagonal in the connectivity table is set to "0" by convention.

TABLE 2

|            | Platform 1 | Platform 3 | Platform 3 |
|------------|------------|------------|------------|
| Platform 1 | 0          | 1          | 1          |
| Platform 2 | 1          | 0          | 0          |
| Platform 3 | 1          | 0          | 0          |

At block 650, CEE table data 590 relevant to the CEE agents 570 is distributed from the master tables 580 to the CEE agents 570. Initially, complete tables may be sent to the CEE agents 570. The Master CEE tables 580 may be published to all of the CEE agents 570 in the CEE, or the CEE agents 570 may only be supplied with the table data that they need. For example, a receiver may have multiple transmitters with which it could communicate, however only one transmitter is communicating. Therefore an initial data distribution may contain all potential transmitters (with no connectivity listed for all but one).

After the table data 590 has been initially been distributed, subsequent table data 590—that is distributed may include only those table entries having changes. The changes can be distributed asynchronously, as they occur, to minimize the information exchange between the CEE servers 560 and the CEE agents 570. Moreover, extensive calculations do not have to be re-computed for every single transmission event, saving time for both the CEE servers 560 and the CEE agents 570, which would have to wait for those results.

Figure 7:
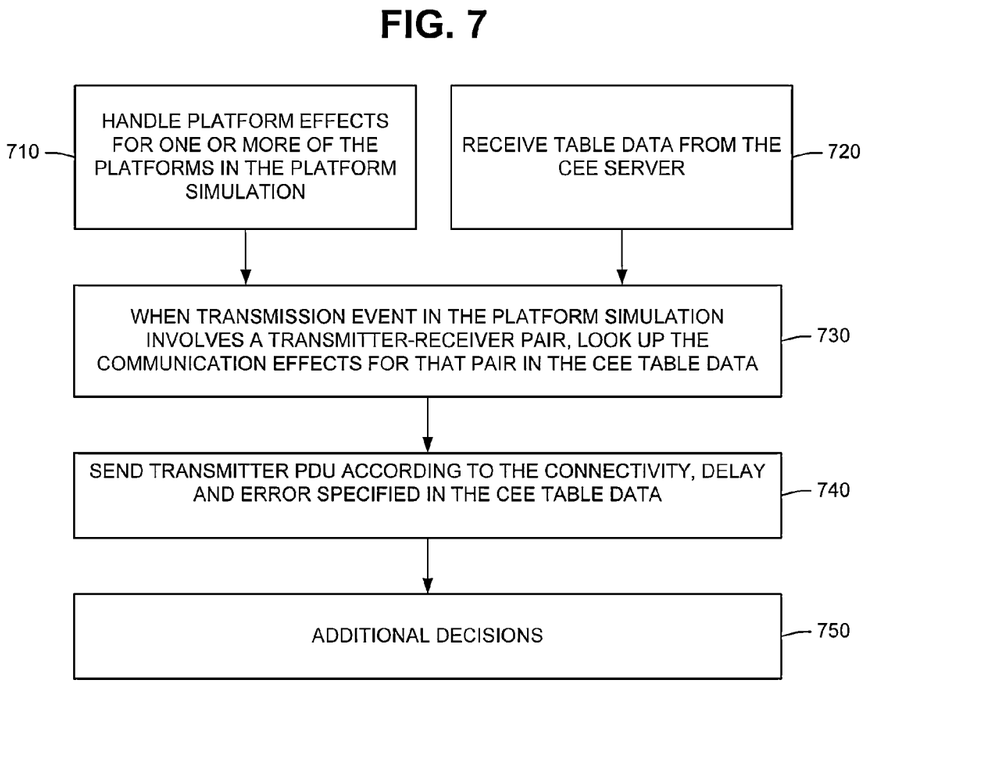
FIG. 7 is an illustration of a method performed by a CEE agent.

Reference is now made to FIG. 7, which illustrates an example of operations performed by a CEE agent 570. At block 710, the CEE agent 570 handles platform effects for one or more of the platforms in the platform simulation. At block 720, the CEE agent 570 receives table data from the CEE server 560. Both are ongoing processes.

At block 730, when a transmission event occurs in the platform simulation between a transmitter-receiver pair, the CEE agent 570 looks up the communication effects for that pair in the CEE table data 590. The CEE agent 570 uses the table data 590 to determine whether the message would have arrived.

At block 740, if the CEE table data 590 indicates that the message would arrive, a transmitter PDU is sent to all available receivers. The transmitter PDU is sent according to the connectivity, delay and error specified in the CEE table data 590. Thus, the CEE table data 590 provides a very close approximation without having to wait for additional computations to be performed and without having to wait for a query result from the network simulation.

At block 770, any additional decisions by the CEE agent 570 may be made. These decisions may include random probability draws, which may be communicated back to the CEE server 560 in the form of a "traffic report". The CEE server 560 may use this "traffic report" to appropriately alter the known state of the network simulation, thus improving the modeling used to create the predicted results. The modeling could be improved because the client reports back to the network simulator 540 (i.e. a feedback loop), which makes the network simulator's traffic more representative of the actual network traffic. This feedback loop allows the network simulator traffic to be adjusted to better represent the observed platform simulation traffic, thus providing a better simulation.

Figure 8:
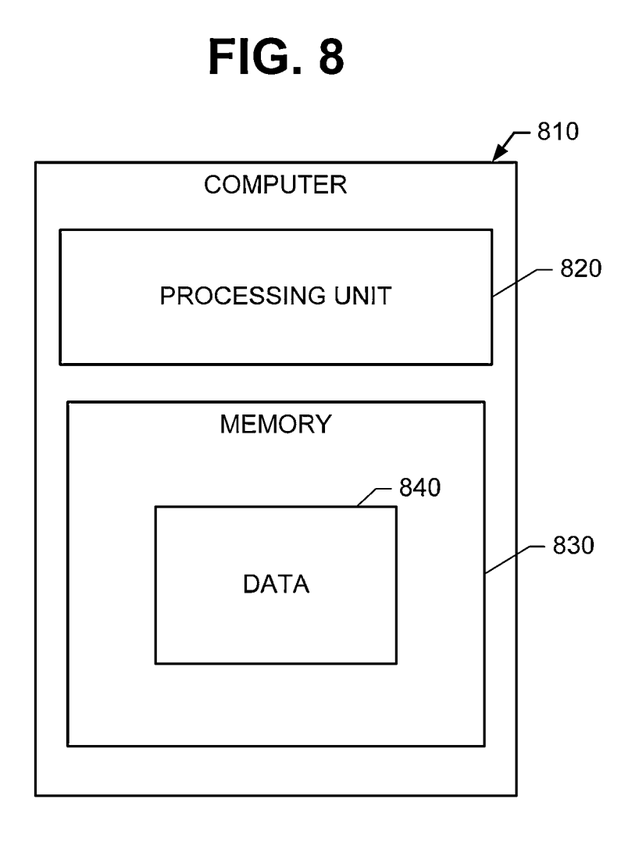
FIG. 8 is an illustration of a computer.

FIG. 8 is an illustration of a computer that can be used in either the platform simulation engine or the CEE. The computer 810 includes a processing unit 820 and memory 830 encoded with data 840 such as platform simulator tools or network simulator tools or CEE server applications, or client agent applications. The memory 830 may also store Master CEE tables 580 or client table data 590.

Thus disclosed is a simulator that offers several advantages, especially for a low latency network. Quick table look-ups reduce the lag between a transmission event and the known results. Drop decisions can be provided immediately rather than waiting for a message timeout.

The CEE supports scalability to very large networks. The communication effects calculations can be sophisticated and complex without affecting the overall simulation performance, which means that the CEE scales well to increasingly higher fidelity simulations.

Scalability is further enhanced because the CEE can put minimal traffic on the simulation data bus. The CEE may promulgate only traffic characteristics of interest to the platform simulation engine, and it may distribute only changes to the characteristics of traffic of interest.

The invention claimed is:

1. A method for a system that runs a platform simulation and a network simulation of a radio network, the method comprising:
   probing the network simulation to determine effects produced between transmitter-receiver pairs represented within the network simulation;
   computing communication effects in response to the probing and saving the communication effects for later use; and
   when a communication event involving a transmitter-receiver pair occurs in the platform simulation, using the saved communication effects to simulate the communication effects for that event.

2. The method of claim 1, wherein the probing includes sending a Probe message from a transmitter to a receiver in each pair of interest in the network simulation.

3. The method of claim 2, wherein the Probe messages are sent periodically and wherein the saved communication effects are updated.

4. The method of claim 1, wherein the saved communication effects indicate statistical connectivity, delay, and error characteristics.

5. The method of claim 1, wherein a communication effects engine is used to probe the network simulation, compute and save the communication effects in response to the probing, and apply the saved communication effects to the network simulation.

6. The method of claim 5, wherein the network simulation is run by a network simulation engine, and wherein the communication effects engine is wrapped around the network simulation engine.

7. The method of claim 1, wherein the platform simulation is run by a plurality of platform simulators; and wherein saving the communication effects includes building tables of communication effects for the transmitter-receiver pairs; and distributing table data to the platform simulators responsible for the receivers in the transmitter-receiver pairs.

8. The method of claim 1, further comprising listening to network traffic in the platform simulation, identifying transmitter-receiver pairs of interest in the platform simulation, and sending Probe messages for the transmitter-receiver pairs of interest.

9. A system comprising:
a network simulation engine for running a network simulation including a plurality of transmitter-receiver pairs;
a communication effects engine (CEE) for simulating real-time, high fidelity communication effects of transmissions between the transmitter-receiver pairs in the network simulation;
the communication effects engine probing the network simulation, computing communication effects in response to the probing and saving the communication effects;
the communication effects engine using the saved communication effects for later events involving the transmitter-receiver pairs; and
a platform simulation engine for running a platform simulation of the transmitter-receiver pairs, the platform simulation engine communicating with the communication effects engine.

10. The system of claim 9, wherein the communication effects engine is wrapped around the network simulation engine.

11. The system of claim 9, wherein the probing includes scheduling Probe messages for the transmitter-receiver pairs of interest in the network simulation.

12. The system of claim 9, wherein the platform simulation engine includes a plurality of distributed platform simulators for performing the platform simulation; and wherein the communication effects engine includes a plurality of a communication effect simulators, each communication effects simulator including a CEE server for storing saved communication effect data relevant to a corresponding platform simulator and a CEE agent for providing an interface between the CEE server and the corresponding platform simulator.

13. The system of claim 12, wherein the CEE server also listens to network traffic in the platform simulation, and identifies the transmitter-receiver pairs of interest.

14. The system of claim 12, wherein the CEE server builds tables of the saved communication effects.

15. The system of claim 12, wherein when a transmission event occurs in the platform simulation between a transmitter-receiver pair, the CEE agent retrieves communication effects for that pair and uses the retrieved data to determine whether the message would have arrived.

16. The system of claim 15, wherein if the retrieved data indicates that the message would arrive, a transmitter protocol data unit (PDU) is sent to all available receivers.

17. An article comprising non-transitory memory encoded with data for functioning as an interface between a platform simulation engine running a platform simulation and a network simulation engine running a network simulation, the data, when executed, causing a processor to simulate real-time, high fidelity communication effects for transmitter-receiver pairs represented within a network simulation, including:
requesting the network simulator to generate Probe messages for all transmitter-receiver pairs of interest;
computing communication effects data in response to the Probe messages and saving the communication effects data; and
using the saved communication effects for later events involving the transmitter-receiver pairs in the platform simulation.

18. The article of claim 17, wherein the data includes a communications effects engine (CEE) server for storing saved communication effect data relevant to a corresponding platform simulator in the platform simulation engine, and a CEE agent for providing an interface between the CEE server and the corresponding platform simulator.

19. The article of claim 17, wherein when a transmission event occurs in the platform simulation between a transmitter-receiver pair, the CEE agent retrieves saved communication effects data for that pair and uses the retrieved data to determine whether the message would have arrived.

* * * * *